(12) United States Patent
Bernstein

(10) Patent No.: US 7,142,743 B2
(45) Date of Patent: Nov. 28, 2006

(54) LATCHING MECHANISM FOR MAGNETICALLY ACTUATED MICRO-ELECTRO-MECHANICAL DEVICES

(75) Inventor: Jonathan Jay Bernstein, Medfield, MA (US)

(73) Assignee: Corning Incorporated, Corning, NY (US)

( * ) Notice: Subject to any disclaimer, the term of this patent is extended or adjusted under 35 U.S.C. 154(b) by 360 days.

(21) Appl. No.: 10/158,623

(22) Filed: May 30, 2002

(65) Prior Publication Data

US 2003/0223676 A1 Dec. 4, 2003

(51) Int. Cl.
*G02B 6/35* (2006.01)
(52) U.S. Cl. .............................. 385/18; 385/17; 385/16
(58) Field of Classification Search ................. 385/18, 385/17, 16
See application file for complete search history.

(56) References Cited

U.S. PATENT DOCUMENTS

| | | | | |
|---|---|---|---|---|
| 4,830,444 A | | 5/1989 | Cloonan et al. ........... 350/3.73 |
| 5,256,869 A | | 10/1993 | Lin et al. .................. 250/201.9 |
| 5,532,855 A | | 7/1996 | Kato et al. .................. 359/117 |
| 5,606,447 A | | 2/1997 | Asada et al. ................. 359/199 |
| 5,767,666 A | * | 6/1998 | Asada et al. .................. 324/97 |
| 5,912,608 A | | 6/1999 | Asada ......................... 335/222 |
| 5,937,115 A | | 8/1999 | Domash ....................... 385/16 |
| 5,966,009 A | | 10/1999 | Asada ......................... 324/97 |
| 6,002,818 A | | 12/1999 | Fatehi et al. ................. 385/17 |
| 6,256,430 B1 | * | 7/2001 | Jin et al. ...................... 385/18 |
| 6,388,789 B1 | * | 5/2002 | Bernstein .................... 359/198 |
| 6,396,975 B1 | * | 5/2002 | Wood et al. .................. 385/18 |
| 6,473,545 B1 | * | 10/2002 | Akkaraju et al. ............. 385/22 |
| 6,496,612 B1 | * | 12/2002 | Ruan et al. ................... 385/18 |
| 6,498,870 B1 | * | 12/2002 | Wu et al. ..................... 385/18 |
| 6,526,194 B1 | * | 2/2003 | Laor ........................... 385/18 |
| 6,526,198 B1 | * | 2/2003 | Wu et al. ..................... 385/18 |
| 6,542,653 B1 | * | 4/2003 | Wu et al. ..................... 385/16 |

OTHER PUBLICATIONS

Lee, Shi-Sheng; Huang, Long-Sun; Kim, Chang-Jim "CJ"; Wu, Ming C., 2×2 MEMS Fiber Optic Switches with Silicon Sub-Mount For Low-Cost Packaging, Tech. Dig., Solid-State Sensor and Actuator Workshop, Hilton Head Island, SC, Jun. 1998.

Huang, Long-Sun; Lee, Shi-Sheng; Motamedi, Ed; Wu, Ming C.; and Kim, Chang-Jin (CJ), Optical Coupling Analysis and Vibration Characterization for Packaging of 2×2 MEMS Vertical Torsion Mirror Switches, SPIE Symp. Microelectronic Structures and MEMS for Optical Processing IV, Santa Clara, CA, Sep. 1998, vol. 3513.

Miller, Raanan A.; Burr, Geoffrey W.; Tai, Yu-Chong; and Psaltis, Demetri, Electromagnetic MEMS Scanning Mirrors for Holographic Data Storage, Solid-State Sensor and Actuator Workshop, Jun. 1996.

* cited by examiner

*Primary Examiner*—Karabi Guharay
*Assistant Examiner*—Dalei Dong
(74) *Attorney, Agent, or Firm*—Boston IP Law group; Rajesh Vallabh

(57) ABSTRACT

A latching mechanism is provided for selectively latching mirrors in an optical switch. The mirrors are selectively movable between rest and actuated positions. The latching mechanism provides stable latching of mirrors in an actuated position, i.e., without power being applied to maintain the actuated state.

38 Claims, 5 Drawing Sheets

US 7,142,743 B2

LATCHING MECHANISM FOR MAGNETICALLY ACTUATED MICRO-ELECTRO-MECHANICAL DEVICES

BACKGROUND OF THE INVENTION

1. Field of the Invention

The present invention relates generally to micro-electromechanical (MEMS) devices and, in particular, to arrayed magnetically actuated MEMS devices such as arrayed mirrors used in optical switches.

2. Description of Related Art

Optical switches are used for routing optical (i.e., light) signals in fiber optic networks. The switches are used to selectively transmit light signals from a set of input fibers to a set of output fibers. The switches typically include an array of movable mirrors or reflectors that can be selectively actuated to deflect light signals to particular output fibers.

The mirror arrays are typically fabricated using MEMS manufacturing processes, which involve using silicon processing and related techniques common to the semiconductor industry to form micro-electromechanical devices.

The movable mirrors can be actuated or controlled in a variety of ways including through electromagnetic actuation, electrostatic actuation, piezoelectric actuation, stepper motors, thermal bimorph and comb-drive actuation.

One problem with prior art optical switches is that high voltages are needed for mirror actuation, which raises the cost of operating the switches.

Another problem with prior art switches is that they require continuous power to retain functionality. Mirrors in the array that have been actuated from a rest position are not stable, i.e., they do not remain in an actuated state if power is removed from the switch. Accordingly, power must be continuously applied to maintain mirror positioning, even if no further switching occurs.

BRIEF SUMMARY OF EMBODIMENTS OF THE INVENTION

In accordance with one embodiment of the invention, a latching mechanism is provided for latching movable mirrors in an optical switch. The mirrors are movable between rest and actuated positions, and the latching mechanism releasably secures mirrors in an actuated position without consuming power. The latching mechanism preferably includes magnetic material on each mirror and on a structure proximate the mirror. The magnetic materials are magnetized in the presence of magnetic flux from an array of magnets used in actuating the mirrors for latching the mirrors in their actuated state.

In accordance with another embodiment of the invention, two arrays of magnets are provided to enhance the magnetic field used in switching mirrors in the mirror array between rest and actuated positions. The two arrays of magnets are located on opposite sides of the mirror array. The stronger magnetic field reduces the voltage needed to move the mirrors.

These and other features of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

An electromagnetically actuated optical switch in accordance with one embodiment of the invention includes a latching mechanism that maintains actuated mirror positioning on the switch without the application of power. While the latching mechanism is described below in the context of electromagnetically actuated, two-dimensional (2D) free-space optical switches, it is also applicable to other types of switches.

Figure 1:
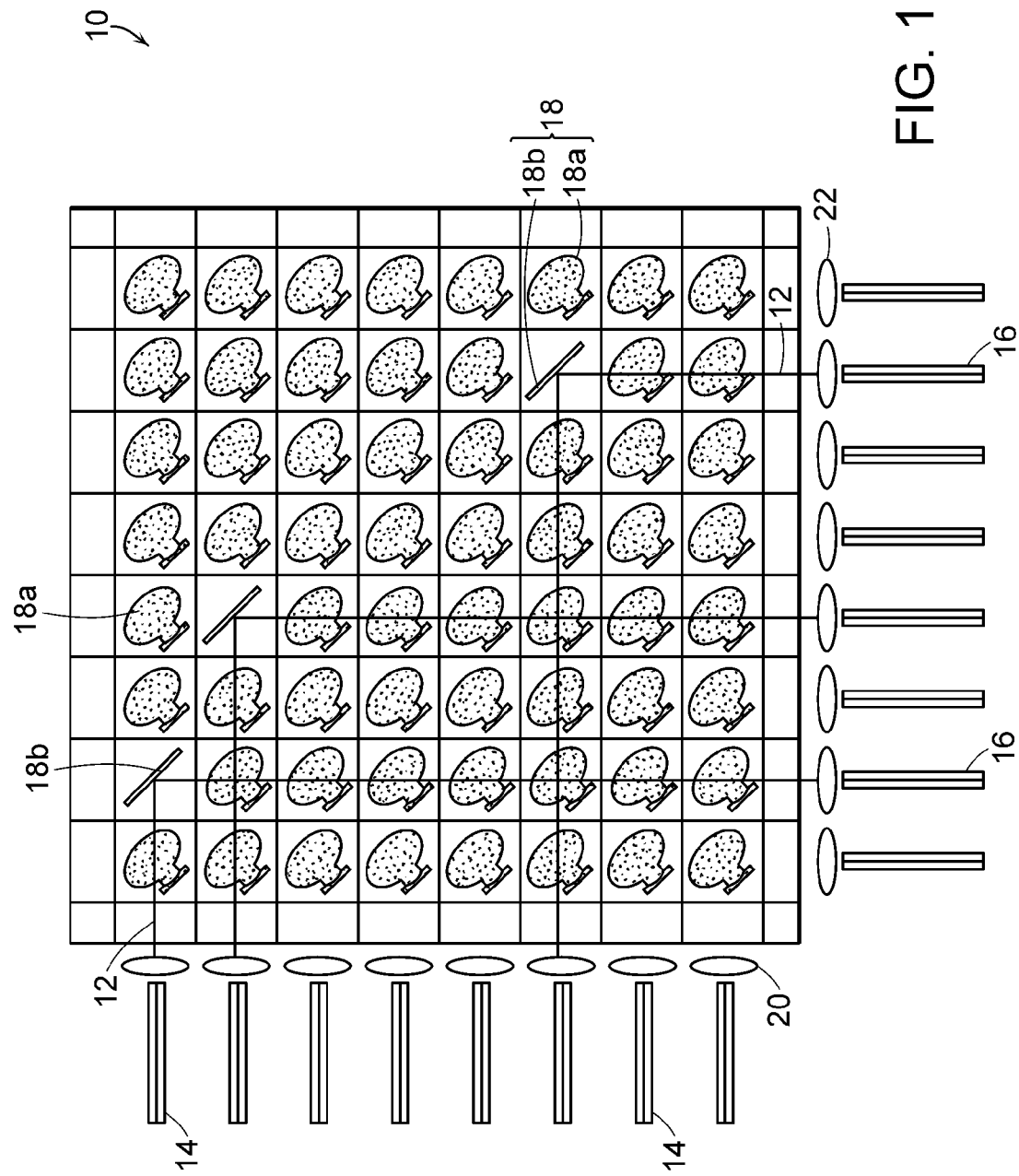
FIG. 1 is a schematic plan view of a two-dimensional free-space optical switch in accordance with one embodiment of the invention.

FIG. 1 is a schematic top view of a representative 2D free-space optical switch 10 having an 8×8 mirror array in accordance with the invention. The figure illustrates one example of possible optical paths through the switch. As shown, light beams 12 from input fibers 14 are routed to particular output fibers 16 by selectively actuating mirrors or reflectors 18 in the mirror array.

A set of collimators 20 (or other beam-forming devices) form incoming optical signals from the input fibers 14 into free-space beams 12 that impinge on selected moveable mirrors 18. The moveable mirrors 18 are controllably actuated so as to individually direct particular beams to selected beam receivers 22 associated with the output fibers 16. The beam receivers 22 may take various forms such as transducers or optical elements for coupling the beams to respective optical fibers.

The 2D free-space optical switch 10 operates by individually addressing mirrors 18 and actuating them such that they are positioned in the optical paths of collimated beams 12, which deflect the beams to output collimators 22. Each mirror 18 in the mirror array is generally either at a rest position wherein it is 'flat' or in the plane of the MEMS substrate forming the array (the "inactive" position as indicated at 18a), or actuated to rotate (about 90 degrees) into the path of the optical beam 12 (the "active" or "light deflecting" position as indicated at 18b).

In the drawings shown herein, each mirror is biased toward the inactive position and actuated to move into an active position. Although not shown, the mirror can alternatively be biased toward the active position and can be actuated to move to an inactive position.

As will be described below, in accordance with one embodiment of the invention, a magnetic latch mechanism is provided to make the positioning of the mirrors in the actuated state stable, i.e., secured in that position without the need for constant power. Power is needed only momentarily when it is desired to switch states between active and inactive positions.

Figure 2:
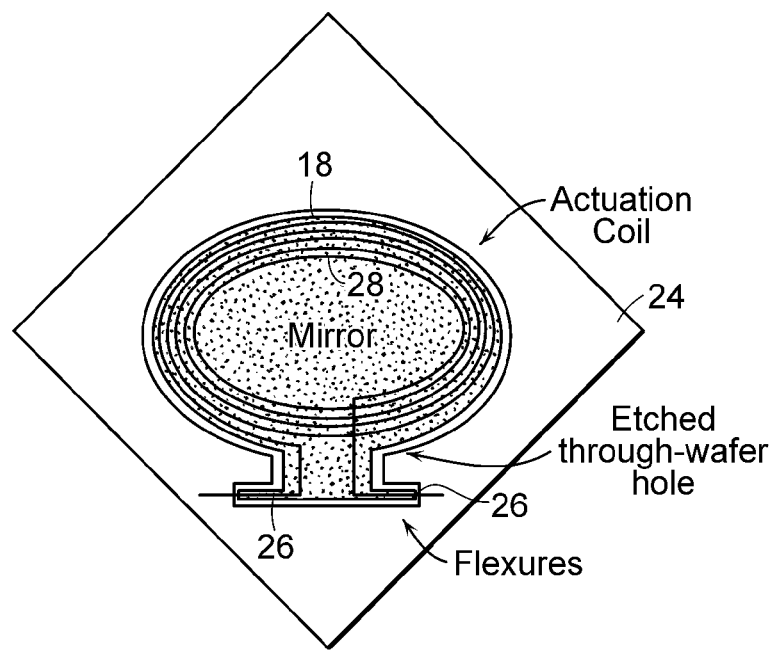
FIG. 2 is an enlarged schematic plan view of one of the mirror elements in the optical switch.

FIG. 2 is a schematic plan view of a single mirror element or device in the mirror array. Each mirror element includes a mirror or reflector 18 rotatably mounted on a wafer support structure 24. The mirror 18 is rotatable about flexures 26 between active and inactive positions. In the FIG. 2 drawing, the mirror 18 is shown in an inactive position wherein it is generally flat in the plane of the support structure.

An actuation coil 28 located on the mirror 18 creates a dipole magnetic field when current is applied to it. An array of external permanent magnets (shown, e.g., in FIG. 5) provides a strong magnetic field gradient at the mirror. When current is applied to the coil, it creates a torque by interacting with the external magnetic field, causing the mirror to rotate about the flexures 26.

The reflective surface of the mirror is preferably located on a side of the mirror opposite to the actuation coils 28 in order to maximize the size of the reflective surface. Alternatively, the reflective surface and coils can be on the same side of the mirror with the coils located, e.g., around the periphery of the reflective surface.

The size of the mirror is largely based on the optical beam size and the size of the coils needed to obtain adequate actuation force. The mirror shape can be elliptical as shown in the drawing. The mirror can alternatively have a variety of other shapes such as, e.g., polygonal and circular shapes.

The mirror array is preferably fabricated using MEMS fabrication techniques, which include silicon processing and related techniques common to the semiconductor industry. The mirrors are preferably made from an SOI (silicon on insulator) layer, which can be about 50 microns thick. It should be noted that other methods of fabricating a device in accordance with the invention (e.g., without SOI wafers) are also possible.

Figure 3:
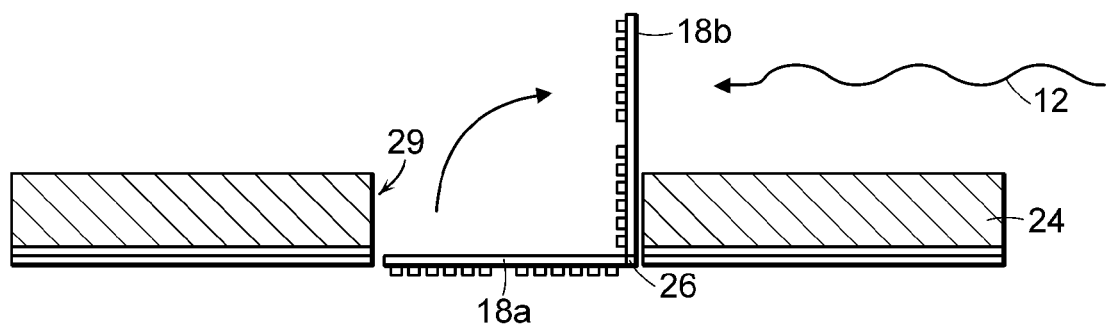
FIG. 3 is a schematic cross-sectional view of the mirror element.

FIG. 3 is a schematic cross-sectional view of a mirror element illustrating mirror movement between active and inactive positions. The mirror wafer support structure 24 includes a through-hole 29 in which the mirror 18 is rotatably mounted. The mirror rotates about its flexures 26, preferably until it strikes a side of the through-hole 29, which acts as a precision stop.

Figure 4:
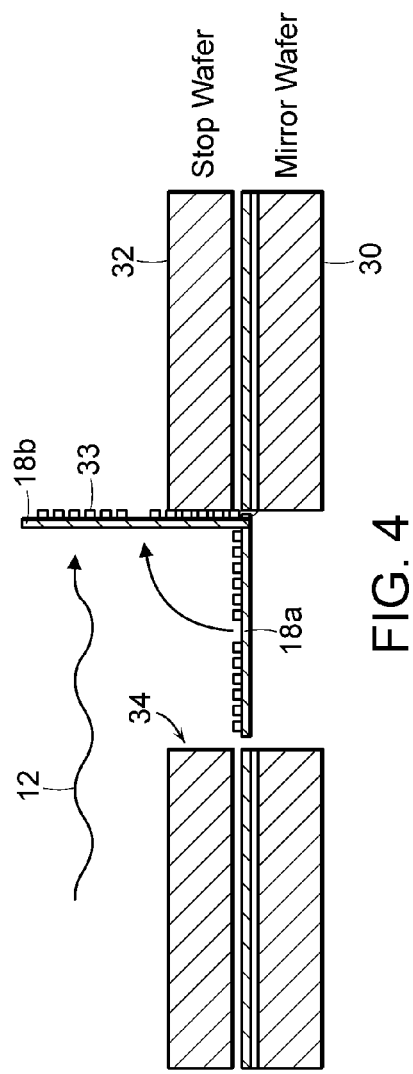
FIG. 4 is a schematic cross-sectional view of an alternate mirror element.

Alternately, the mirror can be formed at the upper surface of a mirror wafer 30, and the support structure can include an additional stop wafer layer 32 with an aligned through-hole 34 as shown in FIG. 4. The additional wafer 32 can lie on the mirror wafer 30, or it can be slightly spaced from the mirror wafer 30. Note that in this particular embodiment, the coils 33 are positioned on top of the mirror and rest against the stop surface.

Figure 5:
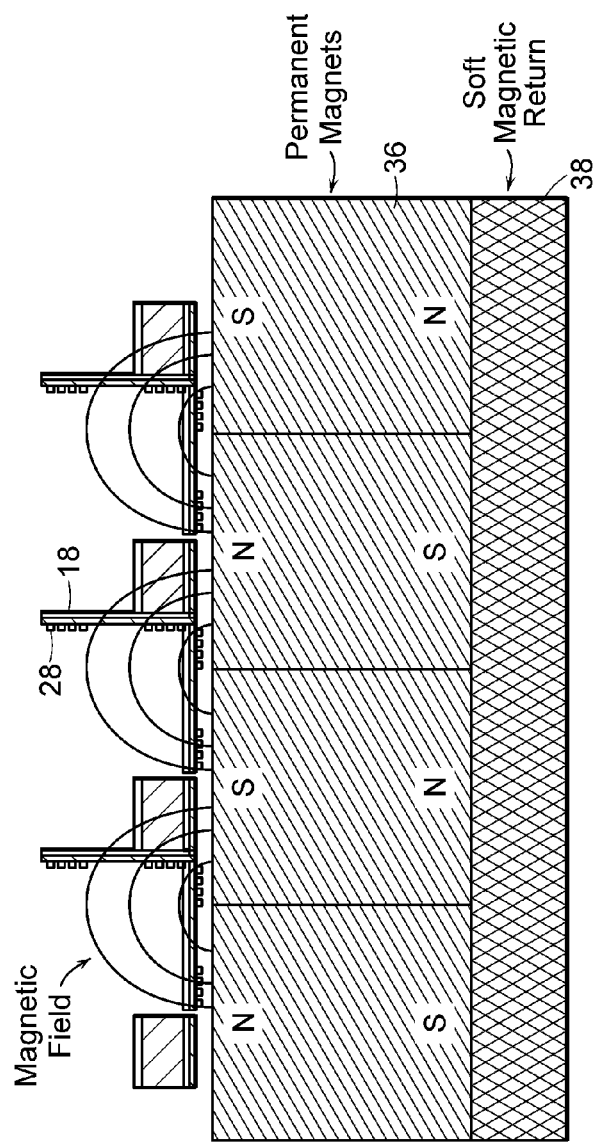
FIG. 5 is a schematic cross-sectional view of a portion of an optical switch in accordance with another embodiment of the invention.

FIG. 5 illustrates an array of magnets 36 that provides magnetic fields acting on the coil actuators 28 on the mirrors 18. The magnets 36 of the array have an alternating polarity arrangement and provide magnetic fields that interact with the coils on the mirrors, resulting in a torque of actuation. As shown, the array of permanent magnets 36 is positioned below the mirror elements, and a soft magnetic return 38 is provided below the magnet array. This particular arrangement of magnets is shown only as an example; many other magnet arrangements are possible.

Actuated mirrors are latched, i.e., releasably secured, in their actuated active position using a latching mechanism in accordance with one embodiment of the invention. The latching mechanism preferably includes soft or hard magnetic materials 40, 42 positioned on each mirror and on the wafer support structure as shown, e.g., in FIG. 6. The flux provided by external magnets (e.g., magnets 36 shown in FIG. 5) is concentrated in regions proximate the mirror 18. This concentration of flux (also known as induced magnetism) results in the magnetic materials 40, 42 acting as magnets themselves. The force of attraction between induced magnets 40, 42 on the mirror 18 and the wafer back latches the mirror in the actuated position. The force of attraction is sufficiently high so as to securely latch the mirror 18 in the actuated position, but low enough such that the mirror can be readily detached when current is applied to the mirror to move the mirror to the inactive rest position.

In the rest or inactive position, no latching force is needed because the spring force at the flexures is about zero in this position since the mirror is preferably biased to remain in the inactive position. The precise position of the mirror in the inactive position is ordinarily not critical since it will typically be out of any optical path in this state.

Thus, current is momentarily applied to the mirror coil when desired to switch the mirror from the active state to the inactive state or vice-versa. No current is needed to maintain either state of the mirror.

The magnetic materials 40, 42 could be deposited by various processes including, e.g., by sputtering, electroplating or evaporation processes. The magnetic materials 40, 42 can be, e.g., Ni, Fe, Co, alloys containing one or more of these metals, or other magnetic material. It can have a thickness of, e.g., 0.1 micron to 20 microns.

Figure 6:
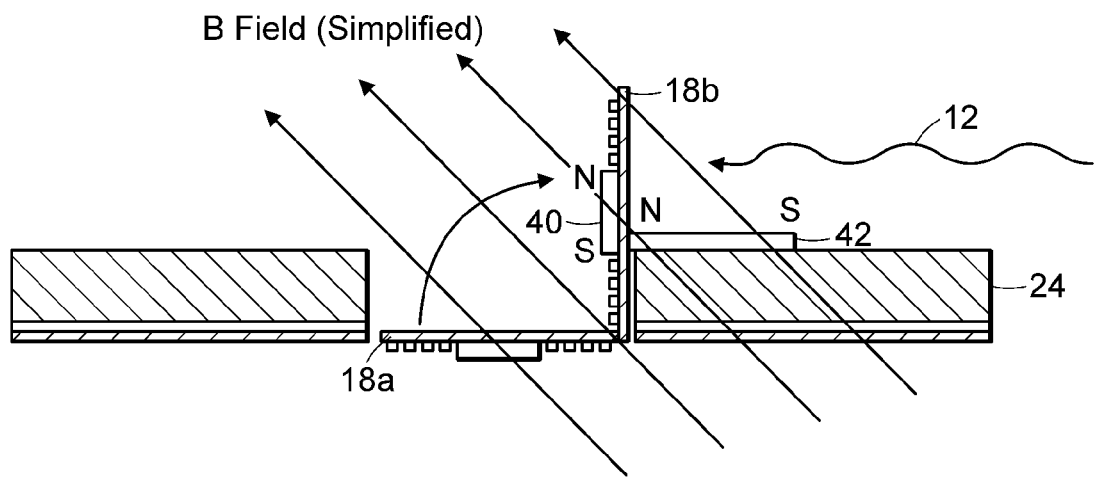
FIG. 6 is a schematic cross-sectional view of a mirror element in accordance with another embodiment of the invention.
Figure 7:
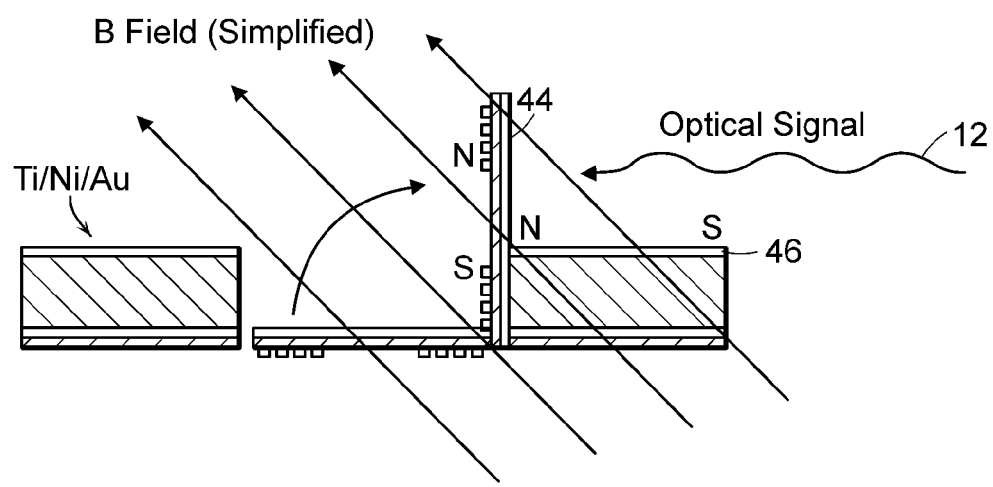
FIG. 7 is a schematic cross-sectional view of a mirror element in accordance with further embodiment of the invention.

In the FIG. 6 embodiment, the latching mechanism includes localized magnetic material 40 on the side of the mirror opposite the reflective side. Alternatively, as shown in FIG. 7, the latching mechanism could include a thin film of magnetic material 44 applied on the reflective side of the mirror. The thin film could be an alloy of a hard or soft magnetic material having a thickness of, e.g., a thousand angstroms up to 20 microns thick. For example, a thin film sandwich of Ti/M/Au (where M represents Ni, Fe, or Co or alloys containing one or more of these metals) can be applied and used as both the magnetic material and the reflective surface of the mirror. The gold layer provides good reflectivity at wavelengths suitable for use in optical telecommunication, while the Ni (or other magnetic film) provides the high permeability needed for latching. The titanium is an adhesion layer. The thin film can be applied to the mirror by a variety of processes including, e.g., sputtering and electroplating.

The magnetic material 46 applied on the wafer structure can be, e.g., a layer of Ni, Fe, Co, alloys containing one or more of these metals, or other magnetic material.

The magnetic material can be a hard magnetic material that is permanently magnetized prior to use in a switch. The hard magnetic material can be deposited by, e.g., the same techniques used for depositing soft magnetic materials, and then permanently poled in the desired orientation by momentarily applying a large external magnetic field.

Figure 8:
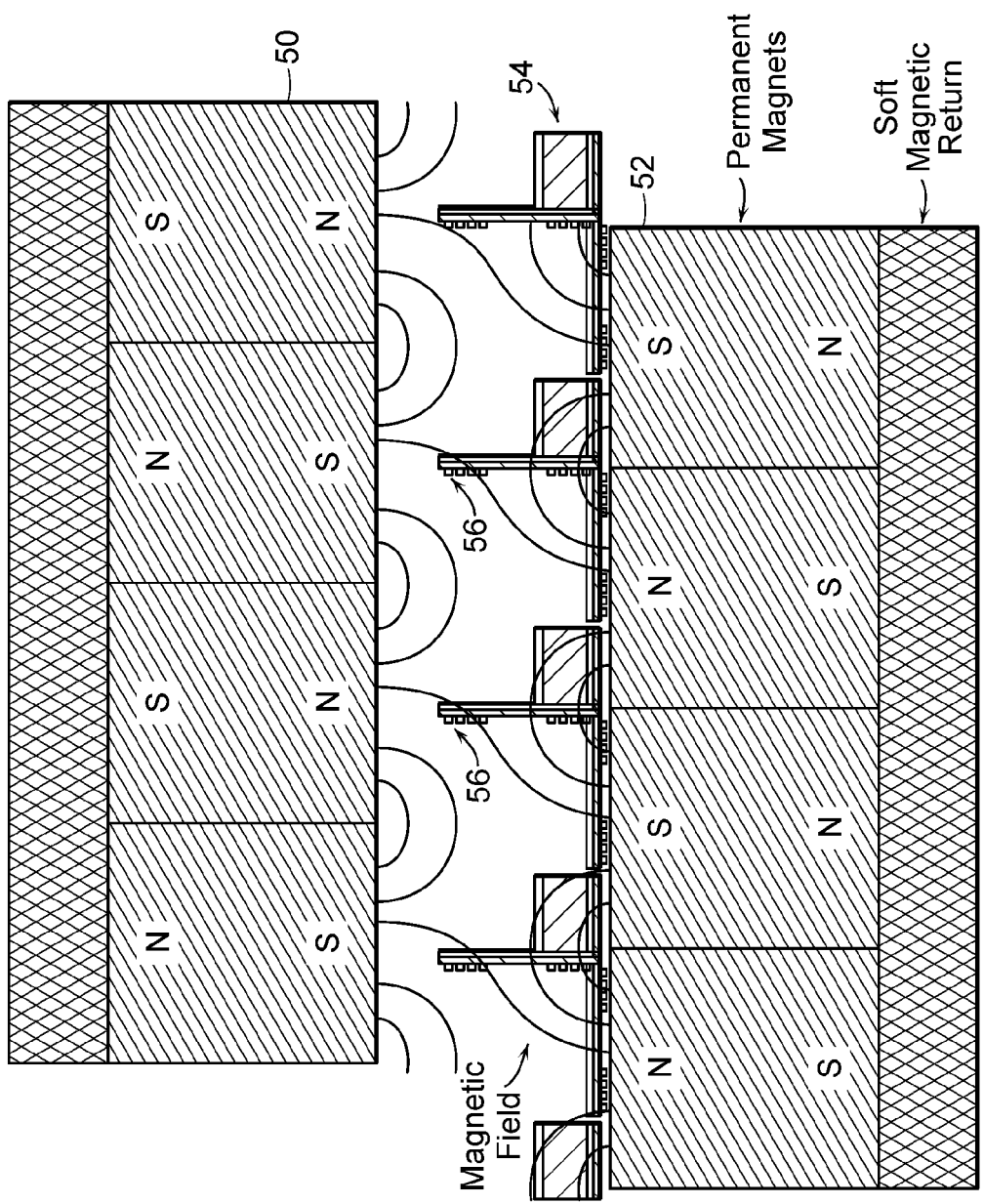
FIG. 8 is a schematic cross-sectional view of a portion of an optical switch in accordance with another embodiment of the invention.

In accordance with another embodiment of the invention, two layers of magnets 50, 52 are provided at opposite sides of the mirror array 54 to optimize the magnetic field at the mirrors as shown, e.g., in FIG. 8. The upper and lower magnet arrays 50, 52 each contain magnets of alternating polarity and are laterally offset with respect to each other, approximately by half a magnet. The additional magnet layer 50 above the mirror array enables additional field shaping to reduce the voltage needed to actuate mirrors. In particular, when the mirrors are actuated, the magnetic field operating on the portions of the mirror coils (indicated at 56) away from the lower magnet array 52 is strengthened due to the presence of the upper magnet array 50. The stronger local magnetic fields reduce the voltage needed at the coils to actuate the mirrors into or out of the active actuated position. The stronger local magnetic fields are particularly useful in overcoming the latching forces applied by the latching mechanism when the mirror is moved from the active position to the inactive position.

Having described various preferred embodiments of the present invention, it should be apparent that modifications can be made without departing from the spirit and scope of the invention.

The invention claimed is:

1. An optical switch mirror array comprising a plurality of mirror assemblies, each mirror assembly including:
   a mirror selectively movable between rest and actuated positions; and
   a latching mechanism detachably securing said mirror in said actuated position without consuming power,
   wherein each mirror assembly further comprises a support on which said mirror is movably mounted, and wherein said latching mechanism includes magnetic material on said mirror and said support, and
   wherein said magnetic material is a hard magnetic material that has been permanently magnetized.

2. The optical switch mirror array of claim 1 wherein said latching mechanism includes magnetic elements that are engageable to detachably secure said mirror.

3. The optical switch mirror array of claim 1 further comprising a magnetic field source for inducing magnetism to detachably secure said mirror.

4. The optical switch mirror array of claim 1 wherein said mirror is a thin planar element having a reflective side, and wherein said magnetic material on said mirror is on a side of said mirror opposite said reflective side.

5. The optical switch mirror array of claim 1 wherein said mirror includes a reflective side, and wherein said magnetic material on said mirror is on said reflective side.

6. The optical switch mirror array of claim 1 wherein said magnetic material on said mirror comprises a thin film applied to said mirror.

7. The optical switch mirror array of claim 6 wherein said thin film forms a reflective surface of said mirror.

8. The optical switch mirror array of claim 6 wherein said thin film comprises a thin film sandwich of Ti/M/Au, where M represents Ni, Fe, or Co, or alloys containing Ni, Fe, or Co.

9. The optical switch mirror array of claim 1 wherein said magnetic material comprises a material selected from the group consisting of Ni, Fe, Co, and alloys containing Ni, Fe or Co.

10. The optical switch mirror array of claim 1 wherein each of said mirrors is movably supported on a support structure, and said support structure includes a stop to inhibit movement of said mirror beyond said actuated position.

11. The optical switch mirror array of claim 1 wherein each of said mirrors is hinged to rotate about 90 degrees when moved between said rest and actuated positions.

12. The optical switch mirror array of claim 1 wherein said latching mechanism releases said mirror when a current pulse is applied to an actuation coil at said mirror.

13. A latch for a reflector in an optical switch, said reflector being movably mounted on a support structure and selectively movable between rest and actuated positions, said latch including a first element on said reflector and a second element on said support structure, said elements cooperating to releasably secure said reflector in said actuated position by permanent magnetism, wherein said elements comprise a hard magnetic material that has been permanently magnetized.

14. The latch of claim 13 wherein said reflector includes a reflective side, and wherein said magnetic material on said reflector is on a side of said reflector opposite said reflective side.

15. The latch of claim 13 wherein said reflector includes a reflective side, and wherein said magnetic material on said reflector is on said reflective side.

16. The latch of claim 13 wherein said magnetic material on said reflector comprises a thin film applied to said reflector.

17. The latch of claim 16 wherein said thin film forms a reflective surface of said reflector.

18. The latch of claim 16 wherein said thin film comprises a thin film sandwich of Ti/M/Au, where M represents Ni, Fe, or Co, or alloys containing Ni, Fe, or Co.

19. The latch of claim 13 wherein said magnetic material comprises a material selected from the group consisting of Ni, Fe, Co, and alloys containing Ni, Fe or Co.

20. The latch of claim 13 wherein said support structure includes a stop to inhibit movement of said reflector beyond said actuated position.

21. The latch of claim 13 wherein said reflector is hinged on said support structure to rotate about 90 degrees when moved between said rest and actuated positions.

22. The latch of claim 13 wherein said latch releases said reflector when a current pulse is applied to an actuation coil at said reflector.

23. A mechanism for positioning a plurality of mirrors in an optical switch, said mirrors being individually addressable and movable between rest and actuated positions, said mechanism comprising:
   means for selectively moving mirrors between rest and actuated positions; and
   a latch for providing stable latching of mirrors in an actuated position without consuming power,
   wherein each of said mirrors is movably supported on a support structure, and
   wherein said latch comprises magnetic material on said mirror and on said support structure, and
   wherein said magnetic material is a hard magnetic material that has been permanently magnetized.

24. The mechanism of claim 23 wherein said latch includes means for applying magnetic force to releasably secure said mirrors in said actuated position.

25. The mechanism of claim 23 wherein said latch comprises magnetically engageable elements.

26. The mechanism of claim 23 wherein each said mirror includes a reflective side, and wherein said magnetic material on said mirror is on a side of said mirror opposite said reflective side.

27. The mechanism of claim 23 wherein each of said mirrors includes a reflective side, and wherein said magnetic material on said mirror is on said reflective side.

28. The mechanism of claim 23 wherein said magnetic material on each said mirror comprises a thin film applied to said mirror.

29. The mechanism of claim 28 wherein said thin film forms a reflective surface of said mirror.

30. The mechanism of claim 28 wherein said thin film comprises a thin film sandwich of Ti/M/Au, where M represents Ni, Fe, or Co, or alloys containing Ni, Fe, or Co.

31. The mechanism of claim 23 wherein said magnetic material comprises a material selected from the group consisting of Ni, Fe, Co, and alloys containing Ni, Fe or Co.

32. The mechanism of claim 23 wherein each said mirror is movably supported on a support structure, and said support structure includes a stop to inhibit movement of said mirror beyond said actuated position.

33. The mechanism of claim 23 wherein each said mirror is rotated about 90 degrees when moved between said rest and actuated positions.

34. The mechanism of claim 23 wherein said latch releases one of said mirrors when a current pulse is applied to an actuation coil at said one of said mirrors.

35. A magnetically actuated mirror array apparatus for an optical switch, comprising:
(a) an array of magnetically actuated mirror elements, each element including:
a mirror;
an actuation coil on said mirror;
a support structure movably supporting said mirror, said mirror selectively movable between rest and actuated positions; and
a latch for releasably securing said mirror in said actuated position without consuming power, wherein said latch comprises magnetic materials on each said mirror and support structure supporting said mirror, and wherein said magnetic materials comprise a hard magnetic material that has been permanently magnetized; and
(b) an array of magnets proximate said mirror elements.

36. An optical switch comprising:
(a) an array of magnetically actuated mirror devices, each device comprising:
a mirror;
a support structure for movably supporting said mirror;
an actuation coil on said mirror for causing movement of said mirror between rest and actuated positions; and
means for providing stable latching of said mirror in said actuated position without consuming power, wherein said means for providing stable latching comprise magnetic materials on each said mirror and support structure supporting said mirror, and wherein said magnetic materials are hard magnetic materials that have been permanently magnetized; and
(b) an array of magnets proximate said array of magnetically actuated mirror devices.

37. The optical switch of claim 36 wherein said means for providing stable latching release said mirror when a current pulse is applied to said actuation coil.

38. An apparatus for positioning mirrors in an array of mirrors forming an optical switch, comprising:
means for moving a selected mirror from a rest to an actuated position; and
means for releasably securing said mirror in said actuated position without consuming power, wherein said means for releasably securing said mirror include a magnetic latch comprising hard magnetic materials that have been permanently magnetized.

* * * * *